US008101130B2

(12) United States Patent

Fink

(10) Patent No.: US 8,101,130 B2
(45) Date of Patent: Jan. 24, 2012

(54) GAS IONIZATION SOURCE

(75) Inventor: Richard Lee Fink, Austin, TX (US)

(73) Assignee: Applied Nanotech Holdings, Inc., Austin, TX (US)

(*) Notice: Subject to any disclaimer, the term of this patent is extended or adjusted under 35 U.S.C. 154(b) by 1138 days.

(21) Appl. No.: 11/855,824

(22) Filed: Sep. 14, 2007

(65) Prior Publication Data

US 2008/0159924 A1 Jul. 3, 2008

Related U.S. Application Data

(60) Provisional application No. 60/891,927, filed on Feb. 27, 2007, provisional application No. 60/941,858, filed on Jun. 4, 2007, provisional application No. 60/844,761, filed on Sep. 15, 2006.

(51) Int. Cl.
*B01J 19/08* (2006.01)

(52) U.S. Cl. ............. 422/186.3; 96/15; 96/100; 96/264; 250/432 R; 250/504 R; 250/461.1

(58) Field of Classification Search ............. 422/186.03; 96/15-100, 264; 250/461.1, 432 R, 504 R
See application file for complete search history.

(56) References Cited

U.S. PATENT DOCUMENTS 5,199,918 A 4/1993 Kumar
5,341,063 A 8/1994 Kumar
5,536,193 A 7/1996 Kumar
6,342,755 B1 1/2002 Russ et al.
6,761,859 B1 * 7/2004 Oda .......................... 422/186.3
6,806,630 B2 10/2004 Birecki et al.
6,958,475 B1 10/2005 Colby
7,011,808 B2 3/2006 Sakatani et al.
7,309,664 B1 * 12/2007 Marzolin et al. ................ 442/97
2002/0142477 A1 10/2002 Lewis et al.
2002/0168305 A1 * 11/2002 Morrow et al. ............ 422/186.3
2004/0022700 A1 * 2/2004 Kim et al. .................. 422/186.3
2004/0095868 A1 5/2004 Birecki et al.
2004/0175304 A1 * 9/2004 Reisfeld et al. ............ 422/186.3
2005/0098720 A1 5/2005 Traynor et al.
2006/0099715 A1 5/2006 Munoz et al.
2007/0029477 A1 2/2007 Miller et al.
2007/0096648 A1 5/2007 Nakajima et al.

FOREIGN PATENT DOCUMENTS

JP 2005-199235 * 7/2005

OTHER PUBLICATIONS

International Search Report mailed on Mar. 13, 2008; PCT/US07/78530, 8 pages.

(Continued)

*Primary Examiner* — Jeffrey T Barton
*Assistant Examiner* — Xiuyu Tai
(74) *Attorney, Agent, or Firm* — Kelly Kordzik; Matheson Keys Garsson & Kordzik PLLC

(57) ABSTRACT

A gas ionizer includes a photocatalyst activated with an electric field to emit electrons. The photocatalyst is also illuminated with an ultraviolet light source. The ionized gas is passed through a chamber between the photocatalyst and the ultraviolet light source. The photocatalyst may be titanium oxide.

14 Claims, 6 Drawing Sheets

OTHER PUBLICATIONS

Banerjee et al., "Physics and Chemistry of Photocatalytic Titanium Dioxide: Visualization of Bacterial Activity Using Atomic Force Microscopy," Current. Science, vol. 90, No. 10, May 25, 2006, pp. 1378-1383.

Thompson et al., "Surface Science Studies of the Photoactivation of $TiO_2$—New Photochemical Processes," Chem. Rev., vol. 106,2006, pp. 4428-4453.

Linsebigler et al., "Photocatalysis on $TiO_2$Surfaces: Principles, Mechanisms, and Selected Result," Chem. Rev., vol. 95, 1995; pp. 735-758.

Xu et al., "Field Emission from Zinc Oxide Nanopins," Applied Physics Letters, vol. 83, No. 18; Nov. 3, 2003, pp. 3806-3808.

Po-Lin et al., "Fabrication and Field Emission Characteristics of Highly Ordered Titanium Oxide Nanodot Arrays," Electrochemical and Solid-State Letters, vol. 8 (10); 2005; p. H83-H86.

Tatarenko et al., "Novel Nanoscale Field Emission Structures: Fabrication Technology, Experimental, and Calculated Characteristics," J. Vac. Sci. Technol. vol. B17(2), Mar./Apr. 1999, p. 647-654.

International Preliminary Report on Patentability, PCT/US2008/054425, Sep. 3, 2009, 9 pages.

* cited by examiner

GAS IONIZATION SOURCE

This application for patent claims priority to U.S. Provisional Patent Applications Ser. Nos. 60/891,927, 60/941,858, and 60/844,761 which are hereby incorporated by reference herein.

BACKGROUND

A source of gas ions is needed for commercial and residential air handling units. It is known that the presence of gas ions may improve the health and attitude of people exposed to this ion source. It is also known that this gas ion source not produce or contain ozone as this is generally considered hazardous to health. Most air handling equipment has high flow rates and pushes large volumes of air.

U.S. provisional application Ser. No. 60/844,761 (the "'761 application"), which is hereby incorporated by reference herein, disclosed the use of carbon nanotubes operating in a field emission mode as a source of ions operating at atmospheric pressure.

The '761 application describes how gas ions are formed at atmospheric pressure by placing a carbon nanotube film on one or both electrodes and then biasing these electrodes while gas is flowing between them (see FIG. 3 of the '761 application). The bias between the electrodes can be in DC mode or in AC mode. Even a series of electrodes can be used (see FIG. 4 of the '761 application). In order for the carbon nanotubes to emit electrons, the electric field applied to the carbon nanotube layer is on the order of 1 V/micron. This requires small gaps or high electrical potentials on the electrode surfaces. For example, a 1 mm gap requires a voltage of 1000V on the electrodes. This is acceptable for small flow rates such as needed in analytical equipment, but will not work well for applications requiring high gas flow rates.

It is also well known that titanium dioxide (also referred to as titanium oxide, titania or $TiO_2$) can be used to decontaminate air (see, Tracy L. Thompson and John T. Yates. Jr., "Surface science Studies of the Photoactivation of $TiO_2$—New Photochemical Processes," Chem. Rev. Vol. 106, pp. 4428-4453, (2006); and S. Banerjee et al., "Physics and chemistry of photocatalytic titanium dioxide: Visualization of bactericidal activity using atomic force microscopy," Current Science, Vol. 90, p. 1378, May 2006). $TiO_2$ is known as a photocatalyst, especially the anatase phase of this material. FIG. 1 shows one mechanism how the titania photocatalyst works. When titanium oxide is exposed to ultraviolet rays, electron and hole pairs are created in the titanium oxide material. These charges diffuse to the surface of the titania. Active species such as oxygen radicals are generated on the surface. The active oxygen radicals oxidize organic contaminants including acetaldehyde (cigarette smell) and biologicals in almost the same way as combustion: converting contaminants into harmless water and carbon dioxide. Other active radicals (both positive-charged and negative-charged) are also formed that may attack other contaminants (not shown).

DETAILED DESCRIPTION

Figure 1:
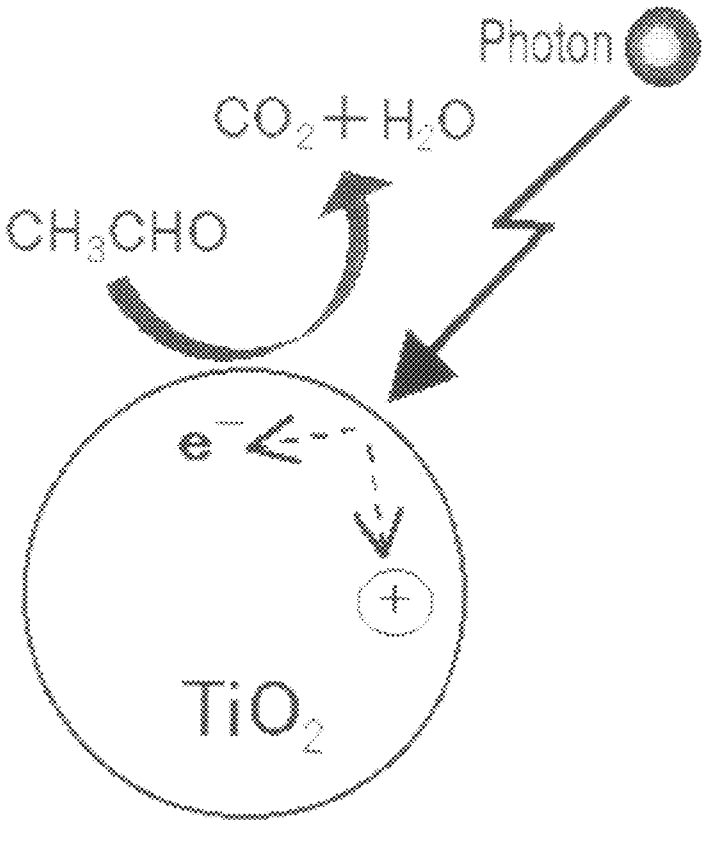
FIG. 1 illustrates how a titania photocatalyst functions.
Figure 2A:
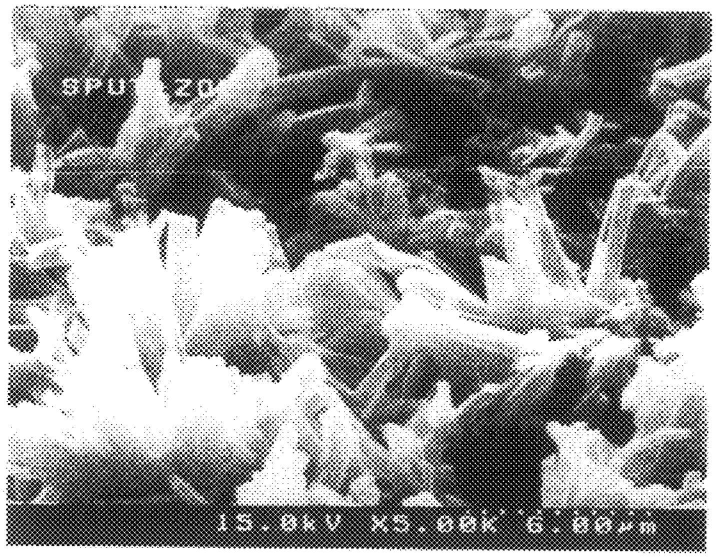
FIG. 2A illustrates a rectangular column structured titania oxide photocatalyst of anatase type.
Figure 2B:
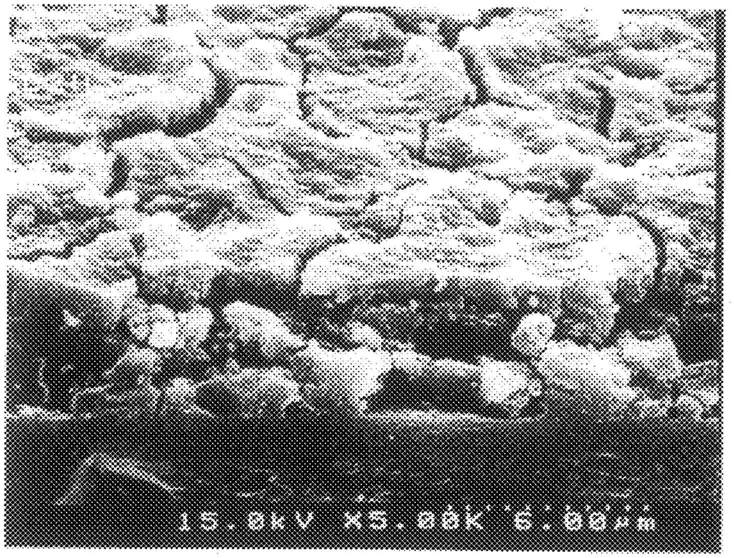
FIG. 2B illustrates a photocatalyst treated by a slurry coating method using a binder.

Titania can have several physical forms. Some forms are round or spherical and some forms are columnar with sharp ends or edges. FIGS. 2A and 2B show examples of these two forms. FIG. 2A is a scanning electron microscope image of titania that is in a columnar structure that has sharp edges. FIG. 2B is a scanning electron microscope image of a form of this material that has more spherical particles. The forms that are columnar may be suitable for field emission of electrons, similar to how carbon nanotubes are used to field emit electrons at atmospheric pressure as described in the '761 application. Other patents describe the use of carbon nanotubes for field emitters in vacuum applications (RE38,223 and RE38,561). Metal oxides such as zinc oxide (ZnO) have been proposed as field emitters for vacuum applications (see, C. X. Xu and X. W. Sun, Appl. Phys. Lett., Vol. 83, p. 3806, November, 2003, "Field emission from zinc oxide nanopins"). Zinc oxide, Si and similar materials are low band gap semiconductors and thus can be used as field emitters. Other metal oxides and diamond materials are considered as wide band gap semiconductors (2.5-7.0 electron volts wide). Metal oxides such as tin oxide ($SnO_2$), with a band gap of about 3.6 electron volts, and titanium oxide ($TiO_2$) with a band gap of about 3.0-3.2 electron volts, are considered wide band gap semiconductors. Prior art teaches that they would not make good field emitters unless they are made very small, as it would be difficult to get a charge from the conducting electrode that the semiconductor is attached to the surface of the wide band gap semiconductor. As an example, the patents by Kumar (U.S. Pat. Nos. 5,536,193, 5,199,918 and 5,341,063) teach that the distance between the injection surface and the emission tip be closer than the mean free path of electrons in the emission tip material, which is expected to be on the order of 20-50 angstroms and certainly in the range of 10-100 angstroms. Some inventors propose methods around this by coating a conducting field emitter structure with nanometer-sized particles of insulator materials such as titania, silica, etc. (see U.S. Pat. No. 6,342,755) or mixtures of insulating and conducting materials. But even in this example, the mixture is characterized as a mixture of "electron emitting materials and insulating materials." The '755 patent teaches that the insulating materials are not included in the list of electron emitting materials. The Kumar patents do teach field emitters from wide band gap materials, but only if they are protruding above a conducting matrix on the order of the electron mean free path in the materials as described above.

One reference mentions the use of titanium oxide as a field emitter ("Fabrication and Field Emission Characteristics of Highly Ordered Titanium Oxide Nanodot Arrays", Po-Lin Chen, Wen-Jun Huang, Jun-Kai Chang, Cheng-Tzu Kuo, and Fu-Ming Pan, Electrochem. Solid-State Lett., Volume 8, Issue 10, pp. H83-H86 (2005)) In this example, nanometer-sized dots of titania are coated onto a conductor; they used a p-doped Si substrate. Chen et al. also teach that the $TiO_2$ film be thermally annealed in a vacuum environment at 450° C. for 2 hours to introduce oxygen defects and vacancies to promote oxygen diffusion in order to reduce the electrical resistance of the titanium oxide film and thus improve the field emission properties. Furthermore, the size of the particles is on the order of 10 nm-100 nm. Tatarenko et al. ("Novel nanoscale field emission structures: Fabrication technology, experimental, and calculated characteristics," N. I. Tatarenko, et al., J. Vac. Sci. Technology B., Vol. 17, March 1999, p. 647) describes a similar experiment where the growth of the $TiO_2$ layer was only 200 nm thick. U.S. Pat. No. 6,806,630 also describes a field emitter in which the surface of the emitter is coated with a $TiO_2$ film. Birecki et al. teach specifically that the thickness of the $TiO_2$ layer be between 2 to 8 nm thick, with 5 nm being the optimal thickness. Because the size or thickness of the titania is so small, electrons are able to tunnel through the insulating layer or hop across the surface of the insulating layer from the conducting contact and emit. For micron-size particles, this would not be possible. The particles in FIG. 2 on the left are microsize and thus would not be considered electron emitters as taught by Chen et al., Tatarenko et al., and definitely by Birecki et al. and Kumar.

This disclosure combines the shape of the columnar structure of the titania shown in the left image of FIG. 2 with the photocatalytic behavior of this material and its negative electron affinity to make a field emitter that may be used at atmospheric pressure and in harsh environments as an enhanced photocatalyst or as an ion generator or both. This approach has several advantages:

1) Unlike carbon or metallic emitters, metal oxide materials are chemically stable—they are already oxidized. They would be stable emitters in air environments or other highly-oxidizing environments.

2) Many wide band gap materials such as diamond and metal oxides (titanium oxide is a good example) are known to have low or negative electron affinities (see Kumar for discussion and definition of negative electron affinity). This means that once an electron is in the conduction band of the material and the electron is able to diffuse to the surface, there is little or no energy to hold on to the electron at the surface.

3) Titanium oxide is used as a photocatalyst for cleaning air and water in many applications. It is easy to form and is inexpensive.

In the embodiments described below, titanium oxide is used to generate ions in an atmosphere of gas that is at 1 mTorr or higher pressure and specifically for gas at standard atmospheric pressure. The embodiments are also used to make a titanium oxide film or a photocatalyst that has higher activity and is more effective at cleaning contaminants from an atmosphere.

Figure 3:
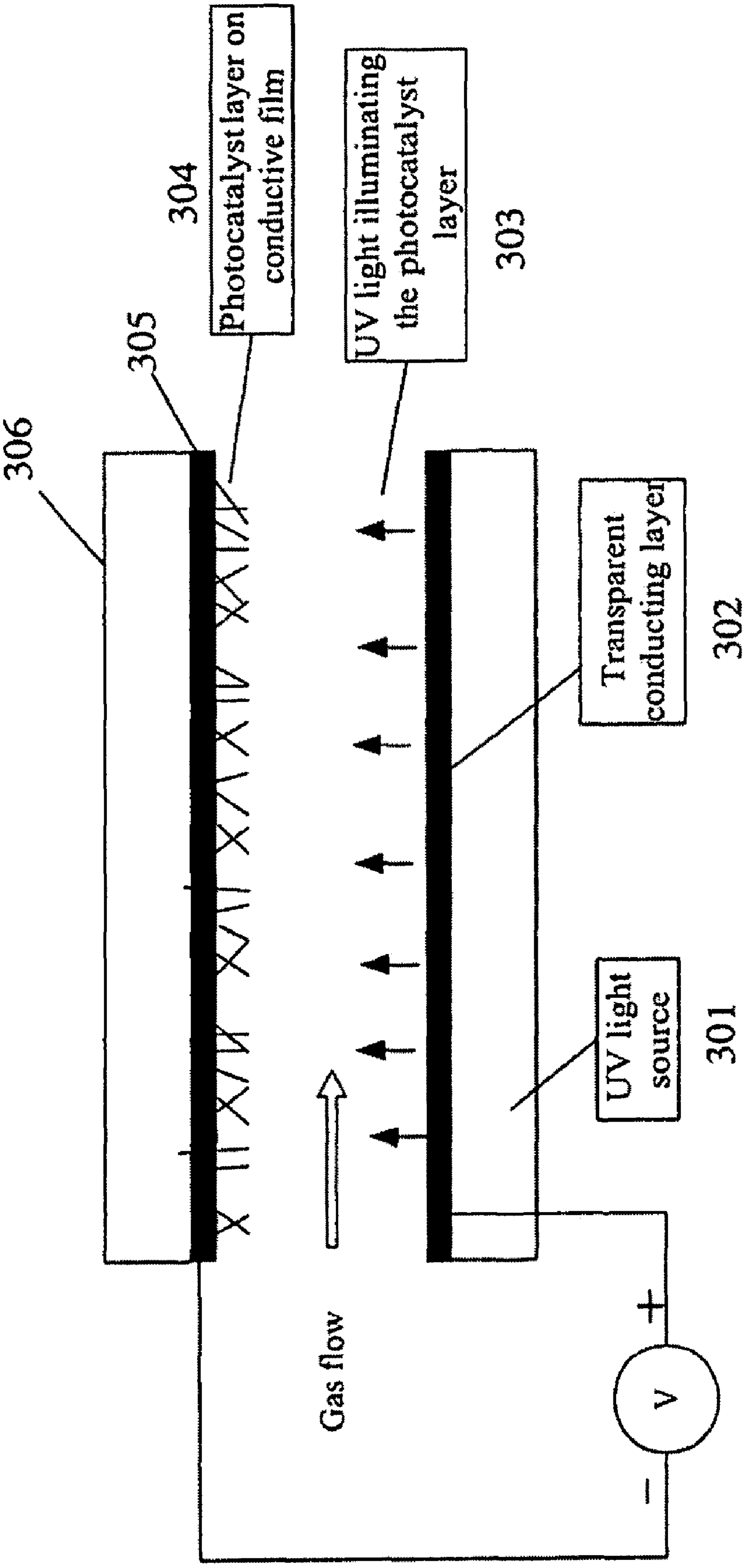
FIG. 3 illustrates an embodiment of the present invention.

Referring to FIG. 3, an embodiment of this invention is to use titanium oxide as a field emitter 304 to create ions. The carbon nanotube film described in the '761 application is replaced by a wide band gap material such as a titanium oxide film. Specifically, in FIG. 3 of the '761 application, the "CNT coating" is replaced with a titanium oxide coating. This titanium oxide coating may be the columnar structure shown in FIG. 2 of this disclosure, since this has a form factor that is conducive to field emission of charges.

Again referring to FIG. 3, another embodiment of this invention is to use titanium oxide as a "photo-activated" field emitter 304 or photocathode. A UV light source 301 is illuminating the photocatalyst layer 304. In this example, titanium oxide is used, but other photocatalyst materials may also be used. The surface of the lamp is coated with a transparent conductive film 302. An electrical bias is placed between the electrode 302 on the light source and the electrode 305 (conductive film) of the photocatalyst layer. The magnitude polarity of the electrical may be adjusted to optimize performance. In one embodiment, UV 303 light that has a wavelength shorter than 380 m (near UV spectrum) or with a photonic energy that is higher than the bandgap of the photocatalyst material illuminates the photocatalyst 304 at the same time an electric field is applied to the surface of the titanium oxide. The photon energy of the UV light 303 to activate the photocatalyst 304 may be below the energy that is typically used to generate ozone. Because the UV light 303 generates electron-hole pairs in the material 304, electrons may drift to the surface 305 of the titanium oxide 304 and be pulled from the material by the applied electric field, depending on the polarity of the electric field. In the same manner, by reversing the polarity of the electric field, holes may migrate to the surface and create a positively charged ion in the atmosphere as a result of an electron exchange with a neutral atom at the surface of the material. Because the charges may already be in all excited state as a result of the UV illumination, the tunneling barrier to emitting the charge may be smaller or non-existent in the case that the titanium oxide surface has negative electron affinity. The electric field may be either DC or AC. If DC, the counter electrode potential may be either positive or negative with respect to the titanium oxide or the conductor 305 on which the titanium oxide 304 sits. If AC, it may be modulated between positive and negative values with respect to the titanium oxide. Combinations of AC and DC are also possible in that AC modulation may be on top of a DC bias. The frequency of modulation and the level of the bias or electric field may be adjusted to optimize the performance of the titanium oxide film 304 both as an ion generator or a more active photocatalyst while minimizing the generation of ozone or both. There are other applications where ozone generation is desired, thus the conditions of operating the device may be changed to optimize ozone generation for these applications, including changing the energy of the UV light. An alternative embodiment is to have the UV light source as the substrate 306 on which the photocatalyst is coated. In this case, the photocatalyst is back-side illuminated. In this case, layer 305 is also a transparent conductor. Both sides may be light sources (306 and 302).

Figure 4:
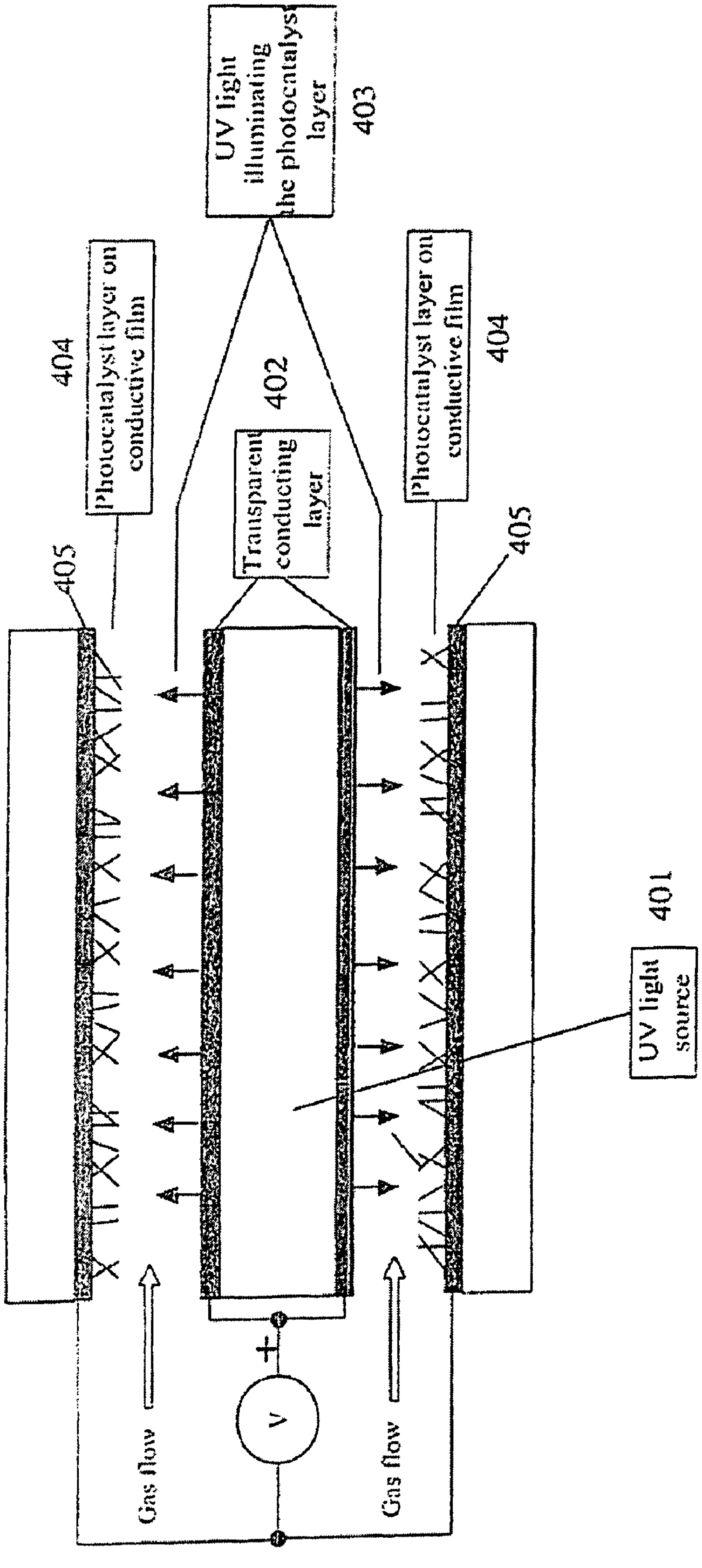
FIG. 4 illustrates another embodiment of the present invention.

FIG. 4 illustrates an alternative embodiment where there are two separate photocatalyst layers on substrates on either side of the UV light source, which take advantage of the fact that the light source may emit light in more than one direction.

Figure 5:
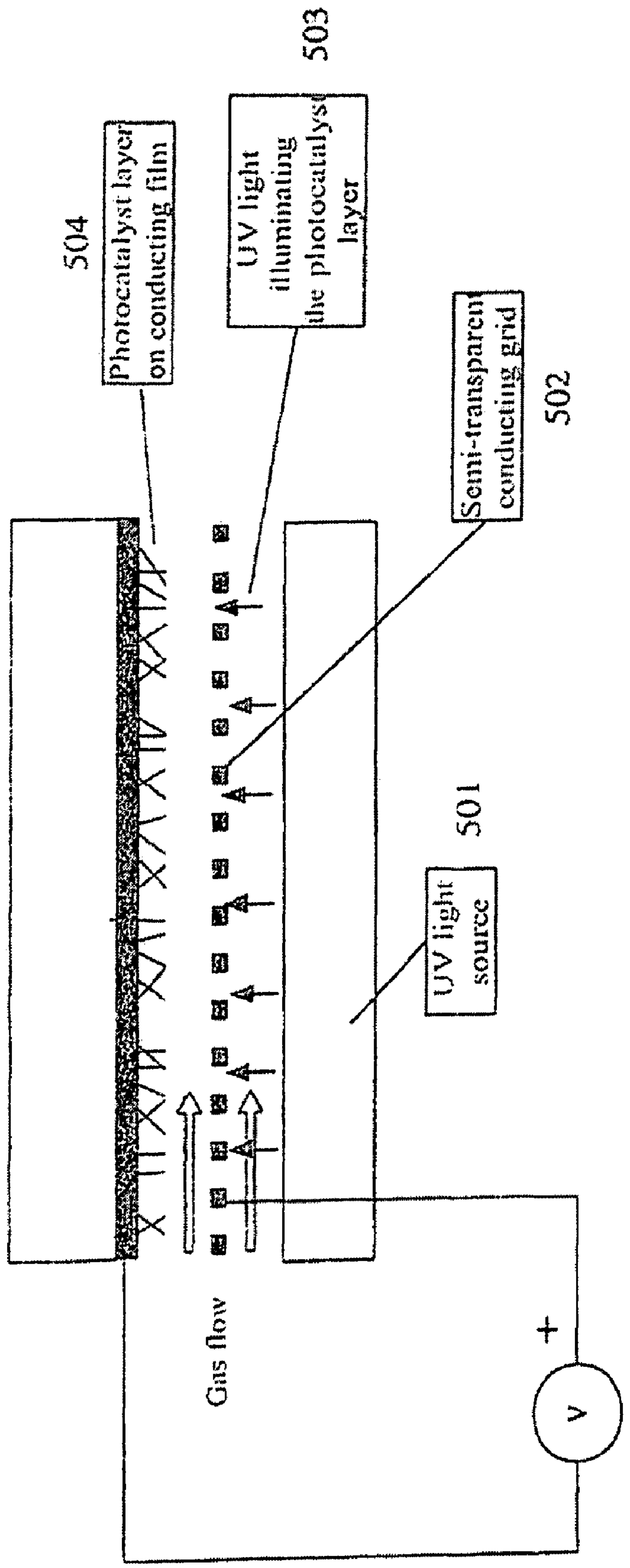
FIG. 5 illustrates another embodiment of the present invention.
Figure 6:
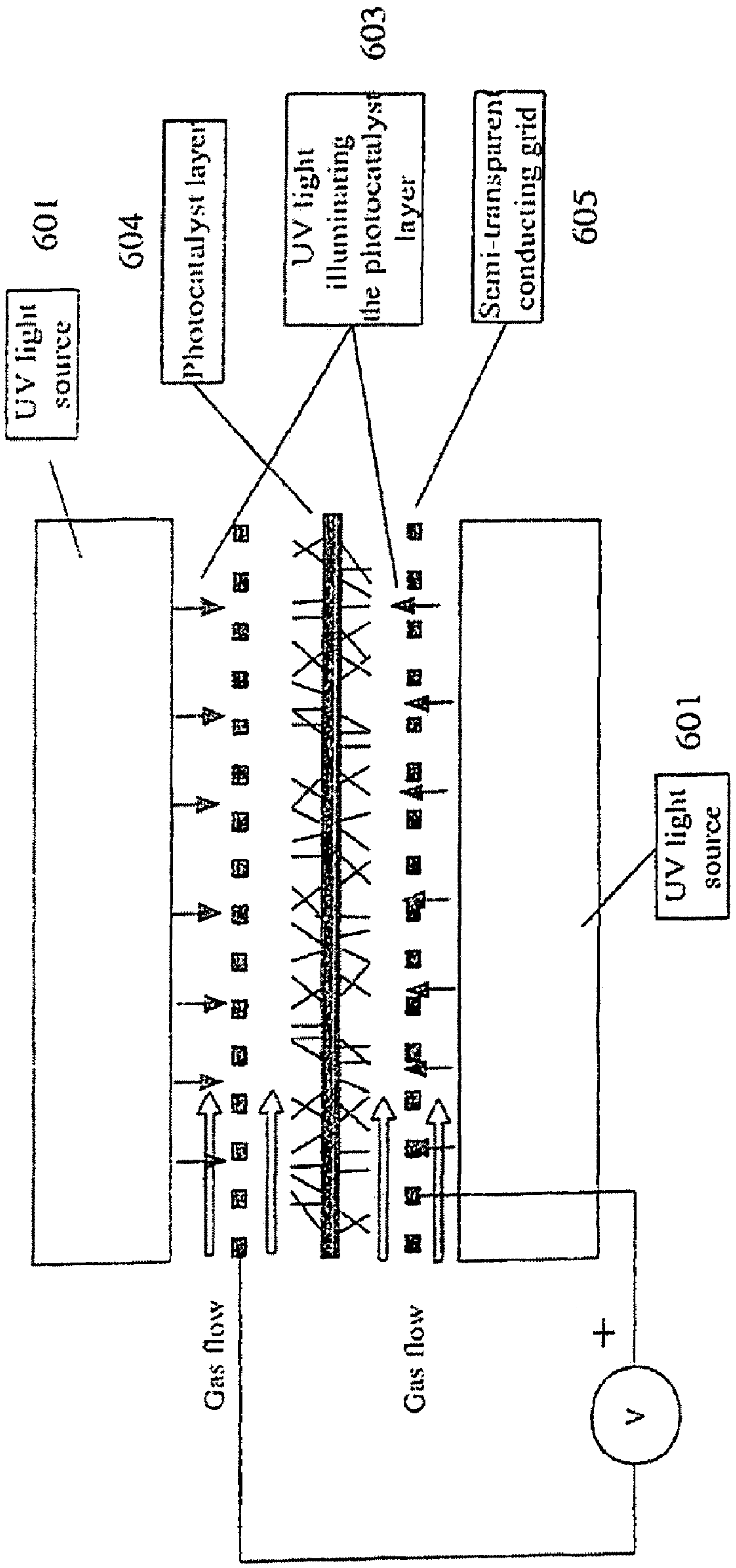
FIG. 6 illustrates another embodiment of the present invention.

FIG. 5 is another embodiment in which the electrode is not on the lamp but is a grid 502 suspended above (or below as depicted in this figure). The grid 502 may be semitransparent to allow the light 503 from the lamp 501 to pass through. The lamp 501 may be any shape. The photocatalyst layer 504 and grid layer 503 are shown flat but this is not required. They could be wavy or undulating, they could be in a cylindrical configuration (example photocatalyst on an inner cylinder facing the grid as an outer cylinder). It may be more important to maintain the gap between the grid 503 and the photocatalyst layer 504. Other configurations are possible, including configurations in which the titanium oxide is on a conducting or insulating layer and the bias is created by placing two grids on opposite sides of the titanium layer (see FIG. 6). It is also possible to have the light source near perpendicular to the plane of the photocatalyst such that the volume of air moving across the photocatalyst is maximized.

The ion intensity may be adjusted by changing the intensity of the light used, by changing the wavelength of the light used, by modifying the polarity and magnitude of the applied electrical field to the photocatalyst, by changing the frequency of the applied electric field or by changing one of more of these variables at the same time. The frequency of the applied electrical field may be as high as the megahertz range. The ion source may be switched on and off by either switching the light source on and off or by switching the applied electric field on and off or both. Fast light sources may also be used to create fast ion sources since there are some laser-based light sources and LEDs that may be switched on and off quickly.

One feature described here is the use of columnar structure titanium oxide as a field emitter Another feature described here is the use of a photocatalyst as a field emitter.

Another feature described here is the use of a photocatalyst activated by a light source and combined with an applied electric field as a source of charged particles to generate ions and to enhance the activity of the photocatalyst at breaking down or decomposing chemical compounds.

What is claimed is:

1. A gas ionizer comprising:

a conducting substrate with a photocatalyst layer deposited thereon;

an ultraviolet(UV) light source with a transparent conducting layer positioned on a face of the UV light source facing the conducting substrate with a gap formed between the UV light source and the conducting substrate; and electronics configured for applying an electric field to the photocatalyst layer such that the conducting substrate possesses a negative bias relative to the transparent conducting layer.

2. The gas ionizer as recited in claim 1, wherein the photocatalyst layer comprises titanium oxide.

3. The gas ionizer as recited in claim 2, wherein the electronics configured for applying the electric field to the photocatalyst layer is coupled to the conducting substrate and the transparent conducting layer.

4. The gas ionizer as recited in claim 2, further comprising:

another substrate with another photocatalyst layer deposited thereon, the photocatalyst layer comprising titanium oxide.

5. The gas ionizer as recited in claim 1, wherein the electronics are configured for applying the electric field to the photocatalyst layer to cause an emission of electrons from the photocatalyst layer into the gap to ionize a gas passing within the gap.

6. A method of manufacture comprising:

depositing a photocatalyst layer on a conducting substrate;

positioning a UV light source with a transparent conducting layer positioned on a face of the UV light source facing the conducting substrate across an air gap from the photocatalyst layer; and adding electronics configured for applying an electric field to the photocatalyst layer such that the conducting substrate possesses a negative bias relative to the transparent conducting layer.

7. The method as recited in claim 6, wherein the electric field operates to cause electrons to be emitted from the photocatalyst layer into the air gap.

8. The method as recited in claim 6, wherein the photocatalyst layer comprises titanium oxide.

9. The method as recited in claim 6, further comprising another substrate with another conductor and another photocatalyst layer deposited on the another substrate, the another conductor coupled to the electronics.

10. The method as recited in claim 7, wherein the electric field operates to cause the electrons to be emitted from the photocatalyst layer into the air gap to ionize a gas within the air gap.

11. A method for operating a negative ion gas ionization source comprising a conducting substrate with a photocatalyst deposited thereon and an ultraviolet (UV) light source with a transparent conducting layer positioned on a face of the UV light source facing the conducting substrate with gap formed between the UV light source and the substrate; the method comprising:

applying an electric field to a photocatalyst; such that the conducting substrate is negatively biased relative to the transparent conducting layer;

activating the UV light source so that UV light illuminates the photocatalyst; and passing a gas through the gap.

12. The method as recited in claim 11, wherein the photocatalyst comprises titanium oxide.

13. The method as recited in claim 11, wherein the electric field operates to cause electrons to be emitted from the photocatalyst into the gap through which the gas is passed.

14. The method as recited in claim 13, wherein the electric field operates to cause the electrons to be emitted from the photocatalyst layer into the gap to ionize the gas within the gap.

* * * * *